Jan. 27, 1953 F. S. AJERO 2,626,729
FEEDING MECHANISM FOR SPREADER AND SEEDER APPARATUS
Filed Jan. 25, 1950 4 Sheets-Sheet 1
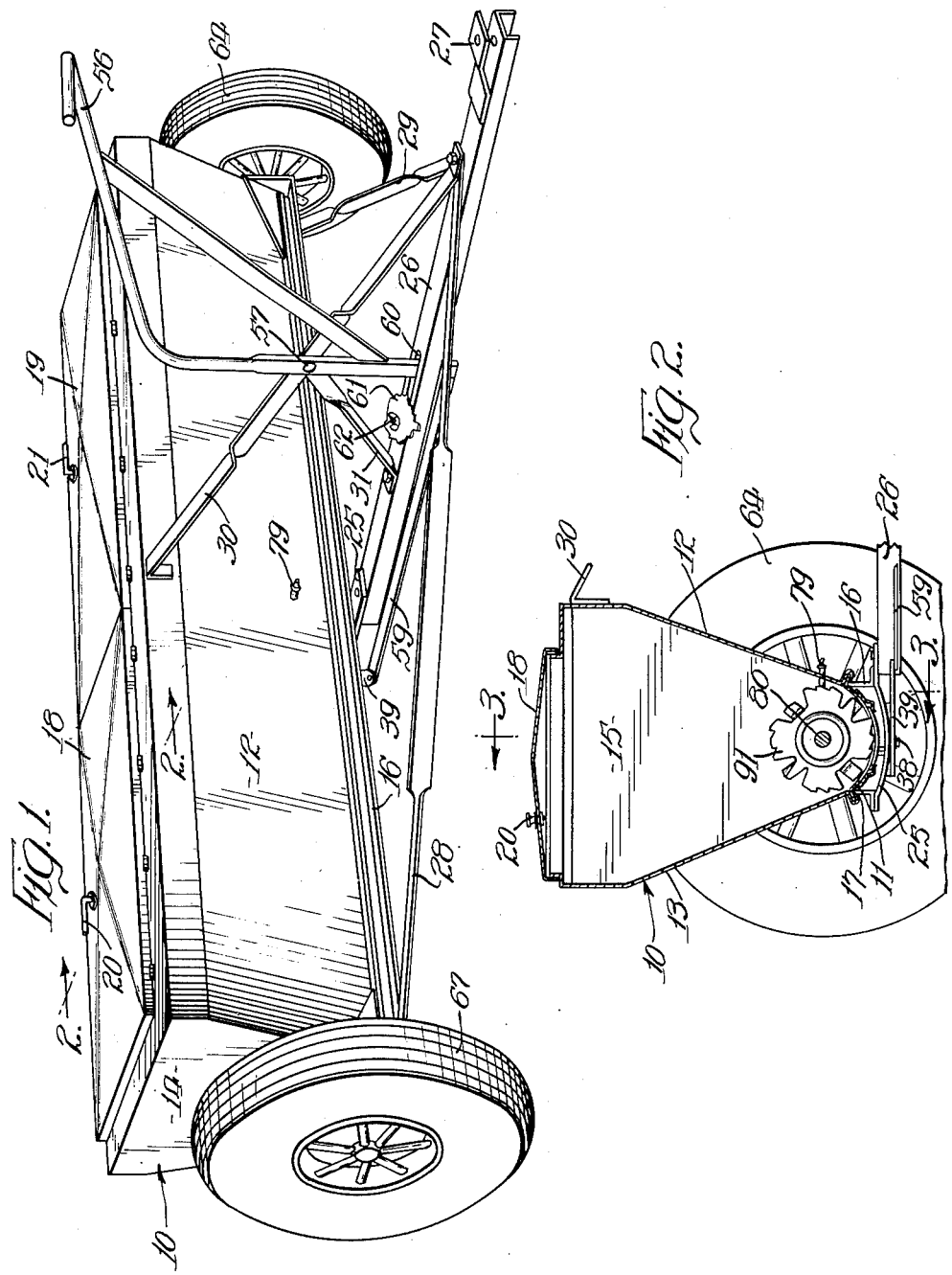
INVENTOR.
Fortunato S. Ajero
BY
Kegan and Kegan
Attys.

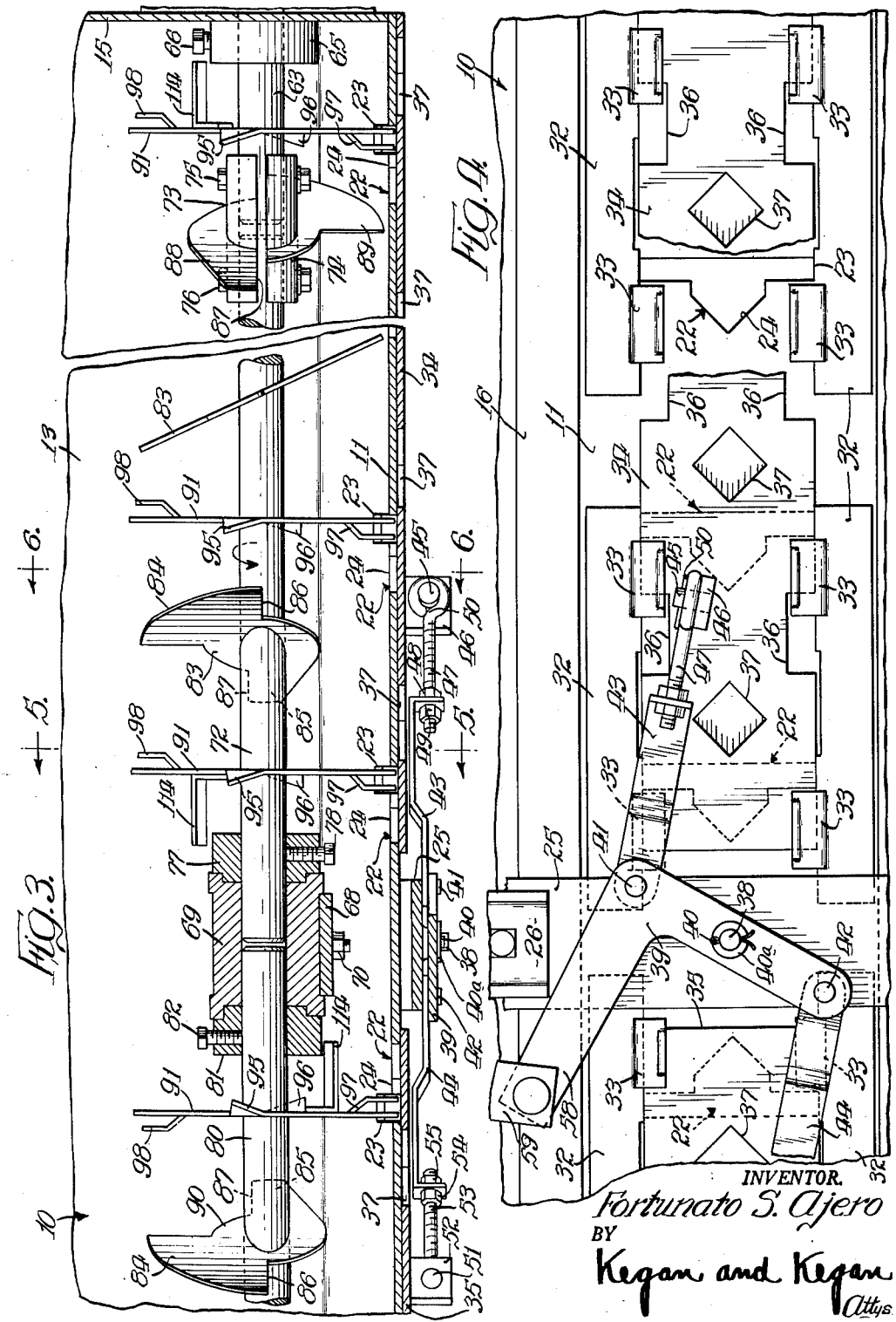

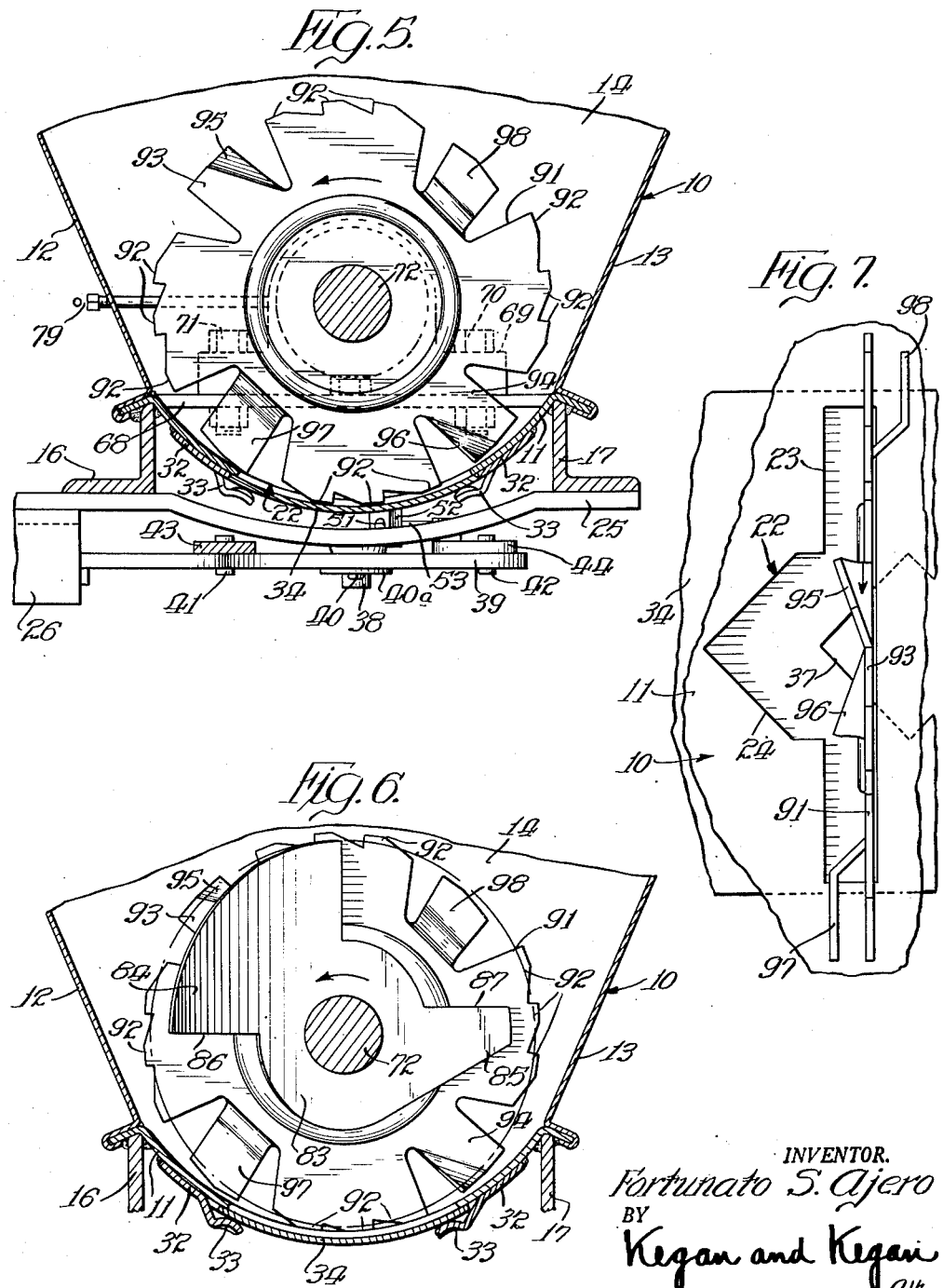

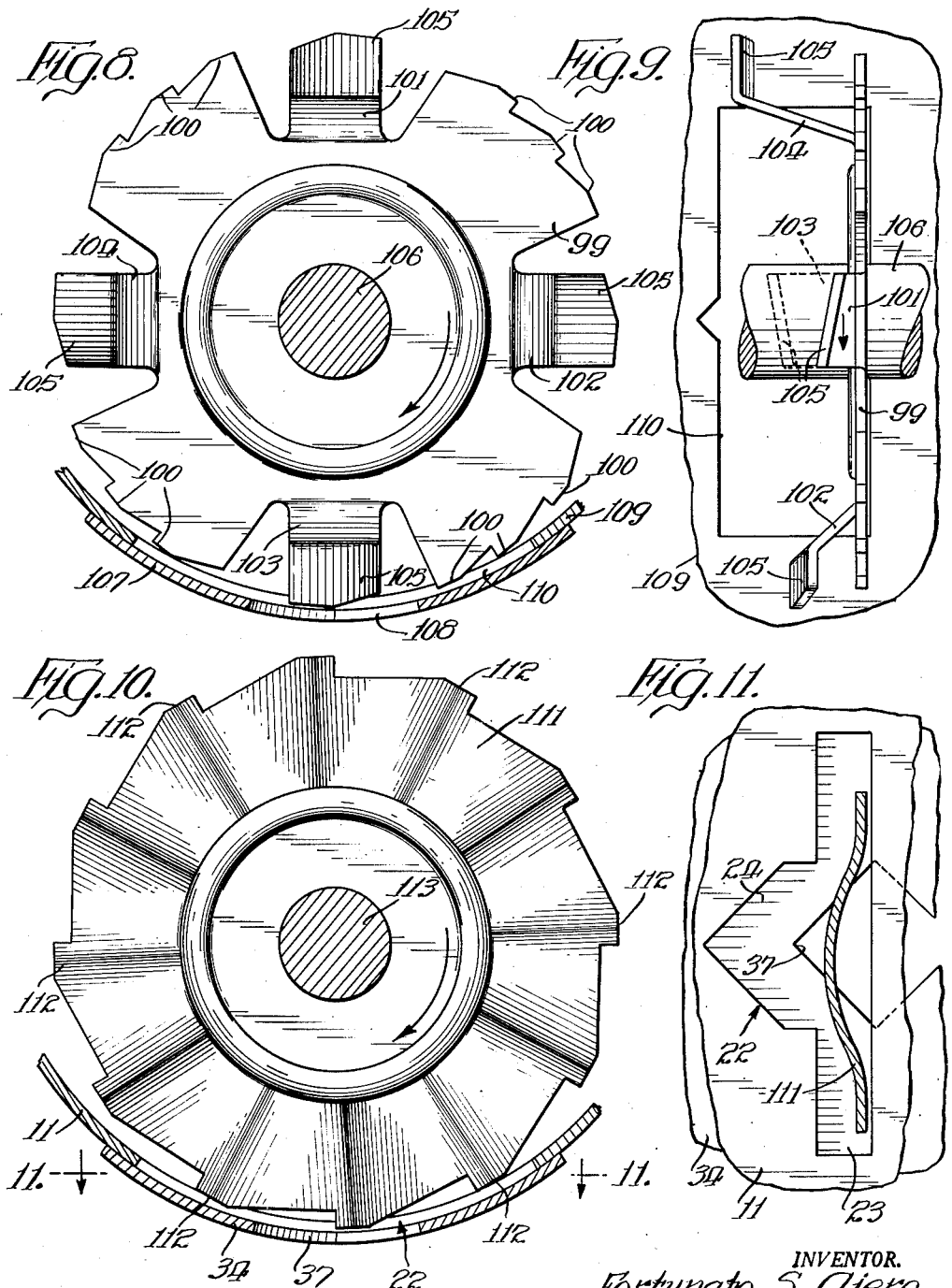

Patented Jan. 27, 1953

2,626,729

UNITED STATES PATENT OFFICE 2,626,729

FEEDING MECHANISM FOR SPREADER AND SEEDER APPARATUS

Fortunato S. Ajero, Chicago, Ill., assignor to Ezee Flow Corporation, a corporation of Illinois Application January 25, 1950, Serial No. 140,495

11 Claims. (Cl. 222—242)

My invention relates generally to improvements in material spreading apparatus, and more particularly to apparatus for discharging fertilizers, seeds, fluent solid chemicals, and like material from the ported hopper of a spreader. My invention has special application to material spreaders of the type shown and described in Patent No. 2,510,231, issued June 6, 1950, to Edmond A. Juzwiak, and entitled "Spreader."

This application is parent to divisional applications Serial Nos. 214,787 and 214,788, each filed March 9, 1951, and entitled "Spreader and Seeder Apparatus."

Many of the fertilizers used in agricultural work are of a highly cohesive, hygroscopic nature, and as a result there is a tendency for tunneling to occur within material spreader apparatus: that is, an arch of cohered material forms over the feed mechanism of the spreader apparatus and prevents the downward flow of material to the feed mechanism. A similar problem exists when dispensing wet, green or improperly cured organic fertilizers, as well as damp and/or densely packed seeds or grain.

I have discovered that one of the principal factors in the formation of tunnels within the hopper is the general use of material feeding and agitating mechanism which forces material radially and/or tangentially of the drive shaft on which the feeding and agitating members are mounted. As a result, material tends to become more densely packed on one side of the hopper than on the other, and forms a hard, dense core at the high pressure side which grows and spreads until it bridges across the hopper above the feed mechanism.

To the end of eliminating tunneling within spreaders and seeder apparatus, and in addition, to improve the distribution of material therein, my invention comprises the combination with a material spreader including a hopper having a discharge port, and rotatable shaft means in said hopper, of first means on said shaft means for propelling a measured quantity of material lengthwise of and in one direction along said shaft means during each revolution of the latter, and second means on said shaft means for propelling a measured quantity of material, but of different amount than said first mentioned quantity, lengthwise of and in the opposite direction along said shaft means during each revolution thereof. Thus, substantially all movement of the material is in an axial direction, while in addition, a differential flow of material is created which provides a uniform distribution of material throughout the length of the hopper, to prevent accumulation of material in one portion of the hopper.

My invention also includes novel material discharging members which operate in the discharge port of the hopper, and work in conjunction with the differential flow feed mechanism set forth above. Improved shutter means for the hopper are also an integral part of the spreader and seeder apparatus of my invention, and facilitate greatly the take down and maintenance of said apparatus.

Accordingly, it is a principal object of my invention to provide material dispensing apparatus for cohesive, hygroscopic, and damp materials, which prevents formation of tunnels within the hopper in which said material is placed.

Another object of the present invention is to provide material spreading apparatus which is characterized by a highly uniform distribution of material lengthwise of the feed mechanism within the hopper, so that the distribution of material to each discharge port in the hopper is uniform regardless of its position in said hopper.

Yet another object of the present invention is to provide members working in the discharge ports of the hopper which insure a positive, uniform flow of material from said ports.

Another object of my invention is the provision of shutter means for a ported hopper which are easy to install, are positive in action, yet may be easily detached from the hopper for purposes of repair, maintenance, or replacement.

The foregoing and such other objects, advantages and capabilities as are disclosed as this description proceeds, or which are inherent in my invention, are illustrated in the accompanying drawings, in which:

Figure 1 is a perspective view of a wheel supported material spreader embodying my invention;

Figure 2 is a fragmentary side elevational view taken in section on the line 2—2 of Figure 1;

Figure 3 is a fragmentary front elevational view taken in section on the line 3—3 of Figure 2;

Figure 4 is a fragmentary bottom view showing my novel shutter means and a portion of the control mechanism therefor;

Figure 5 is a fragmentary side elevational view taken in section on the line 5—5 of Figure 3;

Figure 6 is a fragmentary side elevational view taken in section on the line 6—6 of Figure 3;

Figure 7 is a fragmentary plan view of the bottom interior of the hopper, showing the dis- Figure 8 is a fragmentary side elevational view of a modification of the disk shaped member of Figure 5;

Figure 9 is a fragmentary plan view of the modification of Figure 8;

Figure 10 is a fragmentary side elevational view of another modification of the disk-shaped member of Figure 5; and Figure 11 is a fragmentary plan view taken in section on the line 11—11 of Figure 10.

Like reference characters designate like parts in the drawings and in the description of my invention following hereafter.

Before proceeding with the detailed description of the construction and operation of the several parts comprising the embodiments shown in the drawings, and to better indicate the concepts of my invention, I describe, in brief outline below, the organization and coaction of the principal subcombinations and parts comprising said embodiments. More, particularly, my spreader and seeder apparatus is shown as including (1) a hopper in which the material is placed, said hopper having one or more discharge openings therein, (2) shutter means for regulating the discharge area of each of said discharge openings, (3) an armature rotatable within the hopper and including (4) means for agitating and distributing material lengthwise of the armature, with substantially no tangential or radial flow of material relative to the armature and against the sides of the hopper, and (5) means for positively discharging a measured quantity of material from each discharge port, in which the quantity discharged varies with the setting of the shutter means.

Turning now to Figures 1, 2 and 5, the hopper, designated generally by the numeral 10, includes an arcuate bottom plate 11, a front wall 12, a rear wall 13 and two end walls 14 and 15. A pair of angle irons 16 and 17 extend along the bottom of the hopper 10 to provide transverse stiffening at the points of connection between the front and rear walls 12 and 13 and the bottom plate 11. The hopper 10 is further provided with a pair of hinged covers 18 and 19 and their associated handles 20 and 21, whereby the hopper 10 may be loaded with material which is to be dispensed. As is best shown in Figure 7, taken in conjunction with Figure 3, the bottom plate 11 includes a plurality of spaced apart discharge openings 22, each of which includes a substantially rectangular portion 23 and a principal discharge area 24.

Referring again to Figures 1 and 5, a center bridging member 25 is secured to the lower leg portions of the angle irons 16 and 17. A drawbar 26 extends from and is secured to one end of the bridging member 25. A tractor hitch 27 is fastened to the other end of the drawbar 26. Two tie rods 28, 29 extend from opposite ends of the hopper 10 to the drawbar 26 adjacent the free end thereof. A third tie rod 30 extends from the upper portion of the front wall 12 to the drawbar 26, and is further strengthened by the stiffener 31.

As is best shown in Figures 3 and 4, a plurality of strips 32 are spaced along each side of the bottom plate 11, on the under surface thereof. A pair of spring fingers 33, 33 extend from each of the strips 32 toward the center line of the bottom plate 11, and provide sliding support for the shutter plates 34 and 35, said shutter plates 34 and 35 being positioned on opposite sides of the center bridging member 25. Figure 4 shows each of the shutter plates 34 and 35 as having a plurality of notches 36 in each longitudinal edge thereof, while in addition, each of the shutter plates 34 and 35 includes a plurality of apertures 37, the spacing of which corresponds to the spacing between the discharge openings 22 in the bottom plate 11. Similarly, the spacing of the notches 36 in the edges of the shutter plates 34 and 35 corresponds to the spacing of the spring fingers 33 of the strips 32; however, when the notches 36 are aligned with the fingers 33, the apertures 37 are out of register with the discharge openings 22.

Referring now to Figures 4 and 5, a hinge post 38 extends downwardly from the center bridging member 25. A bell crank 39 pivots on the hinge post 38, and is secured thereto by the cotter pin 40 and the retaining washer 40a. At diametrically opposed points on the bell crank 39 are two pivot pins 41 and 42, a pair of straps 43 and 44 being pivotally connected to the bell crank 39 by the pins 41 and 42, respectively. A pintle 45 extends from the shutter lug 46 on the shutter plate 34, and is connected to the strap 43 by the eye bolt 47. A pair of nuts 48 and 49 adjustably secure the eye bolt 47 to the strap 43, while the cotter pin 50 retains the eye bolt 47 on the pintle 45. Similarly, the strap 44 is connected to the pintle 51 of the shutter lug 52 projecting beneath the shutter plate 35, by the eye bolt 53 and the securing nuts 54 and 55.

When the bell crank 39 is turned in a clockwise direction, as viewed in Figure 4, it is apparent that the shutter plates 34 and 35 move away from the center bridging member 25. Counterclockwise rotation of the bell crank 39 results in movement of the shutter plates 34 and 35 in the opposite direction, whereupon the apertures 37 may be brought into register with the discharge opening 22 in varying degree. In order to provide manual control of the position of the shutter plates 34 and 35 relative to the bottom plate 11, I provide a handle 56 (Figure 1), which pivots about the pin 57 and is connected to the arm 58 of the bell crank 39 by the connecting rod 59. The lower end portion of the control handle 56 operates in a slot 60 in the drawbar 26, the movement of said lower end portion relative to the drawbar 26 being adjustable by means of the flow regulator plate 61, which is adjustably secured to the drawbar 26 by the fastener 62. When the control handle 56 is in the position shown in Figure 1, the shutter plates 34 and 35 are moved away from the center bridging member 26 to the closed position. Upon turning the handle 56 in the opposite direction, however, the discharge openings 22 are uncovered, to the extent that the flow regulator plate 61 permits rotational movement of the lower end portion of the control handle 56 along the slot 60.

Referring now to Figure 3, a stub shaft 63 extends through the end wall 15 and is driven by the wheel 64, the bearing support for the shaft 63 including the thrust collar 65, which is secured in place by the fastener 66. A similar stub shaft 63, not shown, is driven by the wheel 67 and extends into the interior of the hopper 10 at the opposite end wall 14. A center brace 68 (Figures 3 and 5) extends between the two upper edges of the bottom plate 11, and supports the bearing 69, said bearing being secured to the brace 68 by the fasteners 70 and 71. A drive shaft 72 is supported at one end thereof by the bearing 69, the other end of the shaft 72 being drivably connected to the stub shaft 63 by the coupling members 73 and 74, and their associated fasteners 75 and 76. A thrust collar 77 is secured to the drive shaft 72 by the fastener 78, while lubricant is supplied to the bearing 69 through the lubricant fitting 79. A second drive shaft 80 is supported at one end thereof by the bearing 69, and is also provided with a thrust collar 81 secured thereto by the fastener 82.

Referring now to Figures 3 and 6, the drive shaft 72 is shown as having a plurality of wobble plates 83 spaced therealong, said plates 83 being inclined approximately 25 degrees from a plane perpendicular to the shafts 72 and 80, although obviously other angles of pitch may be used. Each of the wobble plates 83 includes a major lobe 84 and a minor lobe 85 angularly spaced therefrom, the respective leading edges 86 and 87 of these respective lobes being substantially radial and circumferentially spaced from each other approximately 180 degrees. In addition to being larger in area than the minor lobe 85, the major lobe 84 is also proportioned such that the radial distance from the axis of rotation of the shaft 72 to its center of gravity is greater than the radial distance to the center of gravity of the minor lobe 85. Figure 3 shows the lobes of the wobble plates 83 as being circumferentially staggered around the shaft 72 for a purpose more fully disclosed below, while in addition, Figure 3 shows the coupling members 73 and 74 as including a minor lobe 88 and a major lobe 89, respectively. The drive shaft 80, only one end portion of which is shown, also includes a plurality of wobble plates 90 arranged similarly, except that the wobble plates 90 are pitched opposite the wobble plates 83.

In addition to the wobble plates 83 and 90, the shafts 72 and 80 include a plurality of substantially disk-shaped feed members 91 which operate in the discharge openings 22. Each of the feed members 91 includes a plurality of stepped feeder teeth 92, while the members 91 are so positioned on the drive shafts 72 and 80 as to penetrate into the rectangular portion 23 of the discharge openings 22 adjacent to the unbroken straight edge thereof (Figure 7). In addition, each of the feed members 91 is provided with a pair of tangs 93 and 94, which extend radially to the working circle of the feeder teeth 92, and from which wings 95 and 96 project respectively. Each of the wings 95 and 96 extends to the same side of the feed member 91, and is inclined from the plane of rotation of said member 91 to sweep material away from the feeder teeth 92 as the shaft 72 (or 80) rotates in the direction indicated by the arrows of Figure 3. A breaker arm 97 projects from that side of the feed 91 which faces the principal discharge area 24, said arm 97 extending radially to substantially the same extent as the feeder teeth 92, so that said arm 97 also penetrates an appreciable amount into the discharge openings 22 during each revolution of the feed member 91. Another breaker arm 98 extends from the opposite side of the feed member 91; however the arm 98 terminates short of the feeder teeth 92, so as not to interfere with the bottom plate 11 upon rotation of the feed member 91. In addition, each of the feed members 91 adjacent to the center bearing 69 and the end thrust collars 65, is provided with an agitator arm 114 which breaks up cohered or packed material with which it comes into contact.

The operation of the embodiment of my invention above described, is as follows: The drawbar 26 is hitched to a tractor or other propelling vehicle, the hopper 10 is filled with the material to be dispensed, and the regulator plate 61 is set to limit movement of the shutter plates 34 and 35 to provide an effective discharge area, as for example that shown in Figure 7, for obtaining a particular rate of flow of material from the hopper 10. As the device is pulled forward, the wheels 64 and 67 drive the shafts 72 and 80, and the wobble plates 83 and 90 and feed members 91 secured thereto. I prefer that the wobble plates 83 and 90 and the feed members 91 be of hard, abrasion resistant material, as for example case hardened or heat treated steel, so that they will pulverize and grind up any material which they contact, without being abraded or otherwise damaged.

Referring now to a single wobble plate 83 on the shaft 72, as said shaft 72 turns the major lobe 84 propels a relatively great quantity of material toward the bearing 69, while the minor lobe 85 propels a relatively small quantity toward the end wall 15 of the hopper 10. In this manner, oppositely directed, substantially coaxial flows are caused by the new, partly broken-off wobble plates. The outer, differential flow, at least a part of which passes over the hopper bottom, is particularly important for the functioning of the machine. As noted above, uniform distribution of such flow, over the hopper bottom, is desirable; and this is greatly aided by the reverse, differential, inner flow. Again, the operation of the feed members 91 is improved by the so-insured uniformity of material delivery to the feed members.

The magnitude of the outer differential flow of material, in this case toward the bearing 69, is a function principally of (a) the area of the cylindrical projections of the lobes 84 and 85, and (b) the radius of the center of gravity of the projected areas with respect to the shaft 72. By "cylindrical projection," as used to define the effective thrust areas of the lobes 84 and 85, is meant the projection of said lobes on a cylinder concentric with the shaft 72. While a difference in either the thrust areas or the radii of the centers of gravity of said spaced lobes, is all that is required to obtain a differential flow of material lengthwise of the shaft 72, in practice both will usually be employed, as in the case of the wobble plates 83 shown in Figure 6. While the wobble plates 90 on the shaft 80 are similar in form to the wobble plates 83, they are pitched oppositely from said wobble plates 83, so that the differential flow of material is again toward the bearing 69. Thus, the wobble plates 83 and 90 combine to prevent accumulation of material at the ends of the hopper 10.

As the shafts 72 and 80 turn, the leading edges 86 and 87 break up and pulverize hardened material which falls within the working area of the wobble plates 83 and 90. In addition, the wobble plates 83 and 90 project material toward the feed members 91. I have found that the wobble plates 83 and 90 are so effective in sweeping material toward the feed members 91, that there is a slight tendency to clog the discharge openings 22 if the feed members 91 in turn are of the type that have wings or vanes to charge the openings with material. For this reason, I prefer to skew the wings 95 and 96 to sweep a portion of the material away from the discharge opening 22, to eliminate any tendency of clogging and to thereby make more effective the operation of the apparatus. At the same time, the breaker arms 97 and 98 continually churn through the material to inhibit stratification of the same. By positioning the feed member 91 to move closely adjacent to the continuous edge of the rectangular portion 23, and also by fabricating the feed member 91 of relatively thin material, any material which coheres or adheres to said member 91 is sheared or scraped off as said material comes into contact with said straight edge.

At the same time, the feed members 91 act as baffle plates against which the wobble plates 83 and 90 project material. Since the feed members 91 act as a partial barrier against movement of material along the shafts 72 and 80, an appreciable portion of the material which is fed along said shafts by the lobes 84 and 85 as the latter dip below the center line of the shafts 72 and 80, is forced upwardly as it piles against the adjacent members 91. However, while the wobble plates 83 and 90 are forcing material toward one of the two adjacent feed members 91, those portions of said plates above the center line of the shafts 72 and 80 are simultaneously camming material in a more or less downwardly direction, as well as along said shafts. Consequently there is a continuous pulsation of material up and down within the hopper 10 as the shafts 72 and 80 turn. This effect is of special importance since it acts to agitate all of the material within the hopper 10 and thereby helps prevent the formation of tunnels in the material being dispensed.

In practice I have found that there is little tendency for the material being dispensed to cling or cohere to the surface of the armature. Where highly cohesive material is being dispensed, this fact can mean the difference between the spreader operating smoothly and efficiently, or becoming clogged as to be non-operative. This desirable operating feature of my invention apparently stems principally from two factors. First, the surfaces of the wobble plates 83 and 90 are inclined, so that the angle of impact is always oblique and the particles of material have an opportunity to slide over the surfaces of said plates 83 and 90. Second, the up and down movement of material between each successive pair of feed members 91 again avoids direct (or right angle) impact of material against the surfaces of said members 91.

Because the stress imposed on the shafts 72 and 80 by each of the wobble plates 83 and 90 is not uniform as the shafts 72 and 80 turn, I prefer to stagger the plates 83 and 90 circumferentially, so that the fluctuations in stresses tend to balance each other out, the maximum shearing and bending stresses thereby being substantially less than would be the case if the plates 83 and 90 were not staggered.

Advantageously, the shutter plates 34 and 35 can be quickly detached from the hopper 10, for cleaning, repairing, or replacement. To remove the shutter plates 34 and 35, they are first moved as far away from the center bridging member 25 as is possible using the control handle 56. Following this, the cotter pins 50 (only one of which is shown) are removed from the pintles 45 and 51. The straps 43 and 44 are then swung to disengage the eye bolts 47 and 53 from the pintles 45 and 51. A few light hammer blows on the lugs 46 and 52 are all that are necessary to move the shutter plates 34 and 35 along the bottom plate 11 until the notches 36 are in alignment with the fingers 33, after which said shutter plates may be lifted away from the bottom plate 11.

In practice, I prefer that the shutter plates 34 and 35 be formed of spring steel or the like, with a slightly greater radius of curvature, in the unflexed condition, than the bottom plate 11, so that said plates 34 and 35 are slightly flexed upon assembly to the hopper 10. This feature has the advantage of maintaining the shutter plates 34 and 35 snugly against the bottom plate 11, and thus prevents accumulation of material between said plates. To facilitate the installation of the shutter plates 34 and 35 on to the bottom plate 11, in view of the differences in curvature, the ends of the spring fingers 33 are bent outwardly a small distance, as shown in Figure 5. Thus, the plates 34 and 35 may be replaced as quickly as they are removed. This feature of quick detachability is particularly desirable since it permits the ready replacement of the shutter plates 34 and 35 with shutter plates having a different number of apertures therein, as would be the case where it is desired to use the device for side dressing. For example, the shutter plates 34 and 35 may each have but two apertures therein, in which case the apparatus will dispense fertilizer or other material in four bands or rows. Because of efficient distribution of material within the hopper 10, and the positive feed action of the feed members 91, the flow of material is uniform from each of the four apertures, even though the effective discharge area may be quite small.

A feed member 99, which may be used in place of the feed member 91, is shown in Figures 8 and 9 as including a plurality of sets of stepped feeder teeth 100, and a plurality of arms 101, 102, 103 and 104, all of which extend to one side of said feeder teeth 100. Each of the arms 101, 102, 103 and 104 is provided with a material propelling portion 105, the portions 105 being spaced laterally from the plane of rotation of the feeder teeth 100 to lie in a helical locus about the shaft 106 on which the feed member 99 is mounted for rotation. When the shutter plate 107 shown in conjunction with the embodiment of Figures 8 and 9 may be identical with the shutter plates 34 and 35, and include a diamond shaped aperture 108 therein, the bottom plate 109 includes a discharge port 110 of substantially rectangular configuration. Each of the propelling portions 105 lies on the same working circle as the feeder teeth 100, and therefore penetrate into the discharge port 110 upon rotation of the shaft 106. As the shaft 106 turns in the direction shown in Figure 8, the propelling portions 105 force material toward the rotating feeder teeth 100, and at the same time constantly break up any material which tends to stratify in the discharge port 110.

A second alternate form of feed member, designated generally by the numeral 111, is shown in Figures 10 and 11 as having a sinuous-shaped peripheral configuration, and a plurality of stepped feeder teeth 112 spaced on the periphery thereof. Thus, as the shaft 113 turns in the direction shown in Figure 10, the feed member 111 imparts a pulsating movement to material in the vicinity of the discharge port 22, moving the material back and forth along the shaft 113 and in this way continually vibrating the material within the rectangular portion 23, to insure a positive flow of material through the aperture 37 in the shutter plate 34.

While I have shown and described certain preferred embodiments of my invention, it is to be understood that these embodiments have been given by way of example only and that various changes and rearrangements of the details shown herein may be made without departing from the spirit of the invention, the scope of which is defined in the appended claims.

I claim:

1. A material spreader including an elongated hopper having at least two discharge ports spaced lengthwise of the hopper bottom, shutter means for said ports on the exterior of said hopper, rotatable shaft means extending lengthwise through at least part of said hopper, a first propeller element on said shaft means intermediate said discharge ports, said element dimensioned to impel a first flow of material along said shaft means toward one of said ports as said shaft means rotates once in one direction, a second propeller element on said shaft means intermediate said discharge ports, said second element dimensioned to impel a smaller flow of material along said shaft means away from said one port as said shaft means make one complete revolution in said one direction and thereby to distribute said first flow over the hopper bottom, and a pair of substantially rigid, non-deformable members positioned on said shaft means for operation in said discharge ports, said members being proportioned to penetrate into but not appreciably beyond said discharge ports as said shaft means rotate said members intercepting the flow of said material along said shaft means to eject a portion of said material through said ports.

2. A material spreader including a hopper having a discharge port therein; a shaft rotatable in said hopper; a substantially disk-shaped member mounted on said shaft for rotation therewith, said member including a portion positioned to penetrate into said discharge port as said shaft rotates in one direction, and one or more portions extending from said member and inclined from the plane of rotation thereof to sweep material away from said member as said shaft rotates in said one direction; first means on said shaft for propelling a first flow of material lengthwise of said shaft toward said member as said shaft turns in said one direction and thereby to charge said discharge port; and second means on said shaft for propelling a second flow of material lengthwise of said shaft away from said member as said shaft turns in said one direction, and thereby to distribute said first flow over the hopper bottom.

3. A material spreader including a hopper; a shaft rotatable in said hopper, said hopper having a discharge port in the bottom thereof which includes an elongated, substantially slot-shaped portion perpendicular to said shaft; and a substantially disk-shaped member secured to said shaft, said member including a plurality of teeth adapted to pass successively into and out of said slot-shaped portion of said discharge port, at least two wings extending from said member on the same side thereof and adapted to penetrate into said slot-shaped portion of said discharge port, said wings being inclined from said member to sweep material away from said teeth as said shaft rotates in one direction, and at least two arms extending from opposite sides of said member to an area adjacent said bottom and slot-shaped portion thereof but slightly spaced inwardly thereof, whereby said arms stir and break up material adjacent to said member as said shaft rotates in said one direction.

4. A material spreader including a hopper; a shaft rotatable in said hopper, said hopper having a discharge port therein which includes an elongated portion disposed substantially perpendicular to said shaft; and a substantially disk-shaped member mounted on said shaft for rotation therewith, said member including one or more teeth adapted to pass into and out of said elongated portion as said shaft rotates in one direction, and one or more protrusions extending axially from said member, each of said protrusions having a material engaging surface inclined from said member to sweep material away from said teeth as said shaft rotates in said one direction.

5. A material spreader including a hopper having a discharge port therein; a shaft rotatable in said hopper; a substantially disk-shaped member mounted on said shaft for rotation therewith, said member including a first portion positioned to penetrate into said discharge port as said shaft rotates in one direction, and at least two arms projecting laterally from one side of said member at circumferential intervals, each of said two arms terminating in a material propelling portion which extends into said discharge port as said shaft rotates and which is inclined from said member to sweep material toward the plane of said first portion as said shaft rotates in said one direction, said two propelling elements being spaced different distances from said member; first means on said shaft spaced from said discharge port for driving a flow of material lengthwise of said shaft toward said member as said shaft rotates in said one direction; and a second means on said shaft spaced from said discharge port for driving material lengthwise of said shaft away from said member as said shaft rotates in said one direction, and thereby to distribute said flow.

6. A material spreader including a hopper, a shaft rotatable in said hopper, said hopper having a discharge port in the bottom thereof which includes a substantially slot-shaped portion perpendicular to said shaft, and a substantially disk-shaped member secured to said shaft, said member including a plurality of teeth adapted to pass successively into and out of said slot-shaped portion of said discharge port, and a plurality of arms projecting laterally from said member at circumferential intervals, each of said arms having a material propelling element thereon which extends substantially radially of said shaft and penetrates into said slot-shaped portion of said discharge port as said member rotates, said material propelling elements each including a face inclined from said disk-shaped member to sweep material toward said member, said material propelling surfaces of said elements being spaced laterally from said member to lie in a helical locus with respect to said shaft.

7. A material spreader including a hopper; a shaft rotatable in said hopper, said hopper having a discharge port in its bottom which includes an elongated, substantially rectangular portion disposed substantially perpendicular to said shaft; and a substantially disk-shaped member mounted on said shaft for rotation therewith, said member including one or more teeth adapted to pass into and out of said portion as said shaft rotates in one direction, and at least two arms projecting laterally from one side of said member at circumferential intervals, each of said arms including a material propelling portion which extends into said portion as said member rotates, and which is inclined from said disk-shaped member to sweep material along said hopper bottom and port, said propelling portions being spaced at different distances from said member.

8. A material spreader comprising a hopper having a discharge port therein, a shaft rotatable in said hopper, a substantially disk-shaped member secured to said shaft and having a serrated, sinuous configured peripheral edge portion, said member positioned to penetrate into said discharge port as said shaft turns in one direction, first means on said shaft for propelling material lengthwise of said shaft toward said disk-shaped member as said shaft rotates in said one direction, and second means on said shaft for propelling material lengthwise of said shaft away from said member as said shaft rotates in said one direction.

9. A material spreader comprising a hopper, a shaft rotatable in said hopper, said hopper having a discharge port in the bottom thereof which includes a slot-shaped portion of substantial width lying perpendicular to said shaft, and a substantially disk-shaped member secured to said shaft, said member having serrations in the periphery thereof positioned to project into said slot-shaped portion as said shaft rotates, said periphery of said member having a sinuous configuration about the median plane of said members as a reference plane.

10. A material spreader including a hopper, a shaft rotatable in said hopper, said hopper having a discharge port therein which includes an elongated, substantially rectangular portion disposed substantially perpendicular to said shaft, and a substantially disk-shaped member mounted on said shaft for rotation therewith, said member including at least two port-penetrating edge portions at least one of which portions is spaced laterally from the median plane of said disk-shaped member, said edge portions being circumferentially spaced upon said disk-shaped member to enter said port at different times during each revolution of said member.

11. A material spreader comprising a hopper, a shaft rotatable in said hopper, said hopper having a discharge port in the bottom thereof which includes a substantially rectangular shaped discharge portion disposed substantially perpendicular to said shaft, and a substantially disk-shaped member secured to said shaft, the edge portion of said member having a curved and serrated configuration so that as said member rotates in said discharge port said edge portion describes a radially and axially reciprocal motion at any one section of said port which lies in the plane of the axis of rotation of said shaft, said edge portion of said member projecting into said discharge port as said shaft rotates.

FORTUNATO S. AJERO.

REFERENCES CITED

The following references are of record in the file of this patent:

UNITED STATES PATENTS

| Number | Name | Date |
| --- | --- | --- |
| 722,528 | Miner et al. | Mar. 10, 1903 |
| 1,104,246 | Cole | July 21, 1914 |
| 1,334,223 | Byrd | Mar. 16, 1920 |
| 1,573,493 | Heyd | Feb. 16, 1926 |
| 2,102,993 | Claudel | Dec. 21, 1937 |
| 2,127,810 | Ditchfield | Aug. 23, 1938 |
| 2,327,923 | Morris | Aug. 24, 1943 |
| 2,510,231 | Juzwiak | June 6, 1950 |